Figure 1:
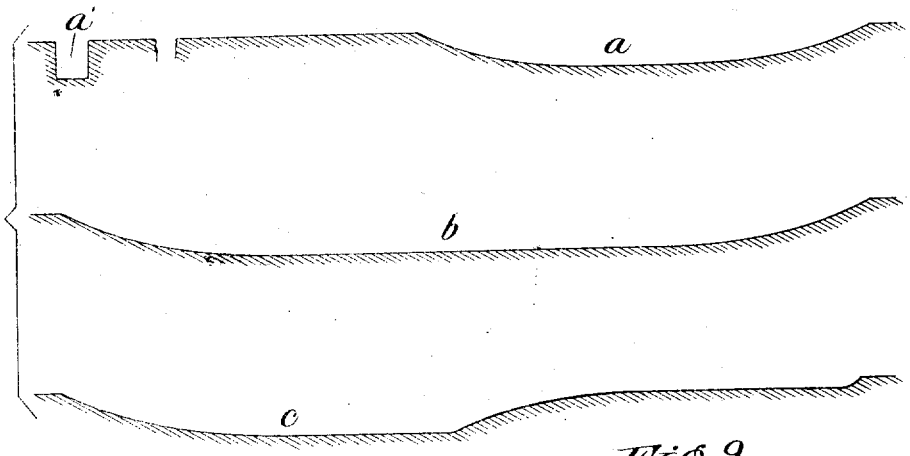

F. B. YINGLING.

RECOIL CHECKING MECHANISM FOR ORDNANCE.

APPLICATION FILED MAY 5, 1915.

Reissued June 22, 1915.

13,938.

3 SHEETS—SHEET 1.

Witnesses

G. L. Baker.

H. P. Jennings

Inventor

Frank B. Yingling by Foster Freeman Watson & Coit

Attorneys

F. B. YINGLING.
RECOIL CHECKING MECHANISM FOR ORDNANCE.
APPLICATION FILED MAY 5, 1915.
Reissued June 22, 1915.
13,938.
3 SHEETS—SHEET 2.
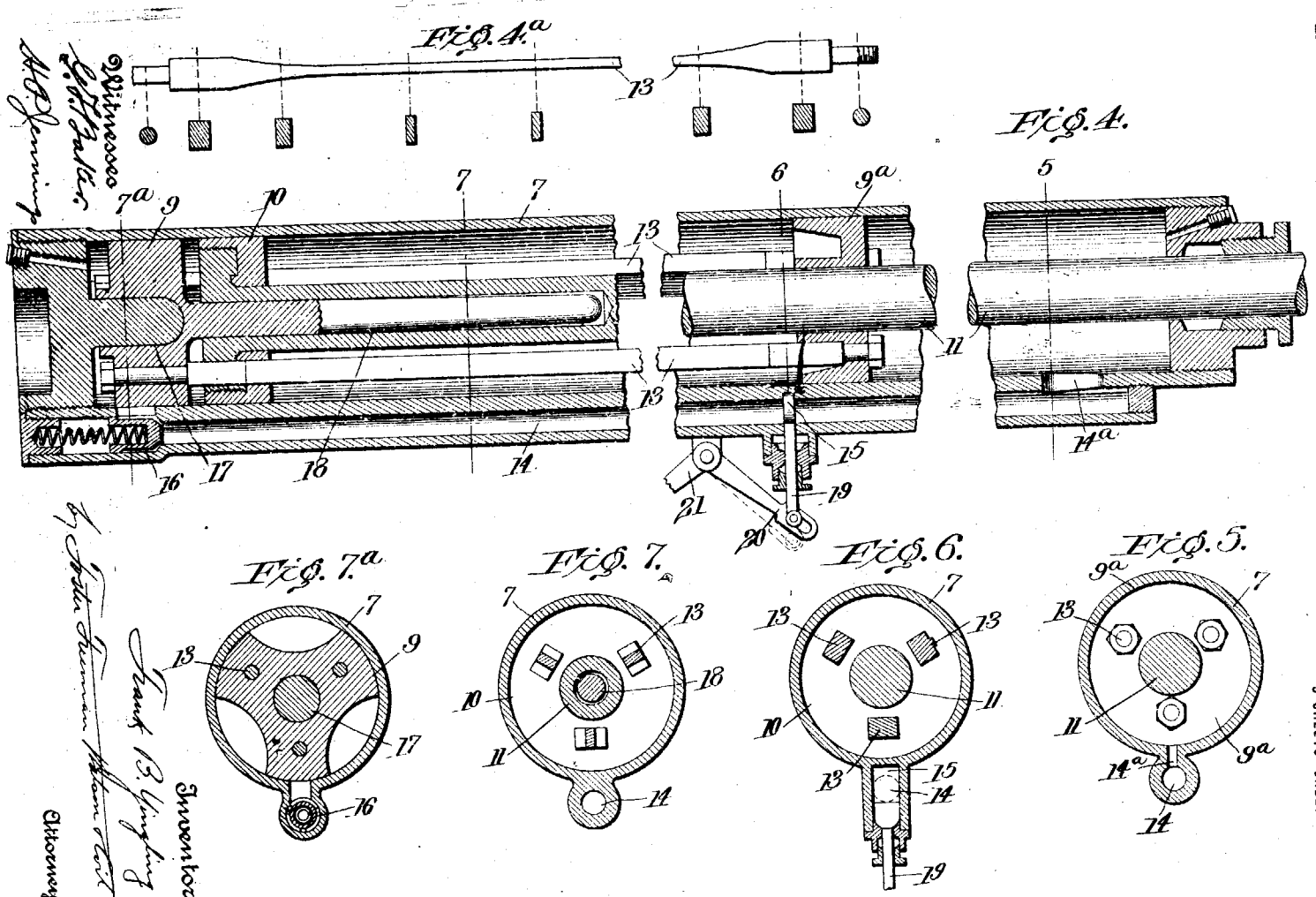
Witnesses
G. H. Baker.
H. P. Jennings
Inventor
Frank B. Yingling
by Foster Freeman Watson & Coit
Attorneys

F. B. YINGLING.

RECOIL CHECKING MECHANISM FOR ORDNANCE.

APPLICATION FILED MAY 5, 1915.

Reissued June 22, 1915.

13,938.

3 SHEETS—SHEET 3.

Inventor

Frank B. Yingling by Foster Freeman Watson & Coit

Attorneys

Witnesses

G. F. Baker

H. P. Jennings

UNITED STATES PATENT OFFICE.

FRANK B. YINGLING, OF HAMILTON, OHIO.

RECOIL-CHECKING MECHANISM FOR ORDNANCE.

13,938. Specification of Reissued Letters Patent. Reissued June 22, 1915.

Original No. 1,043,890, dated November 12, 1912, Serial No. 317,845. Application for reissue filed May 5, 1915. Serial No. 26,162.

*To all whom it may concern:*

Be it known that I, FRANK B. YINGLING, a citizen of the United States, formerly a resident of Washington, District of Columbia, now residing at Hamilton, county of Butler, State of Ohio, have invented certain new and useful Improvements in Recoil-Checking Mechanism for Ordnance, of which the following is a specification.

The present invention relates to improvements in fluid pressure recoil checking mechanism for ordnance, and has for its object to provide means for automatically varying the length of recoil in accordance with variations in the elevation of the gun and to so proportion and arrange the parts that the stress during the recoil, occasioned by firing the gun at any elevation, shall not exceed that required to properly regulate the minimum length of recoil permitted, but will have, throughout such recoils, similar characteristics to that of the minimum recoil. That is, diagrams of the required pressures in the recoil cylinder, during different lengths of recoil, have similar outlines, instead of, for instance, a regular outline for one length of the recoil and an irregular one for other lengths. The resistance due to the fluid in the recoil cylinder plus the resistance of the counter recoil springs during recoils is maintained practically or substantially uniform throughout each length of recoil, or uniformly decreases a small amount as desired, but this resistance becomes less as the length of recoil increases from the minimum permitted, since the checking devices are so proportioned for the different lengths permitted, that they operate in accordance with the retarded velocities of the recoiling parts at each instant of recoil.

The laws, formula and coefficients necessary in proportioning the parts of a recoil carriage for a particular size of gun, projectile, etc., for a set of specifications are well known to those proficient in the design of such constructions so that it is not deemed necessary to elaborate a method of finding the exact shape or dimensions of the checking means. Well known treatises and notes on ordnance construction heretofore published are available for determining suitable dimensions and proportions of such embodiments as I illustrate which have a plurality of recoil lengths.

After the theoretically correct dimensions of the recoil control devices for a particular gun and carriage have been determined, it is frequently necessary, after constructing the parts, to experiment and determine under actual conditions of service just what the dimensions must be to give a uniform resistance or a slightly uniformly decreasing resistance to the gun throughout a particular length of recoil because of some coefficients that enter the formulas which are usually different for various forms of recoil checking devices.

In connection with this embodiment of my invention for recoil checking devices operating as described, reference is made to my application filed December 1, 1904, (Patent No. 818,730, April 24, 1906), and to my application filed December 8, 1905 (Patent No. 1,010,564, December 5, 1911), of which this is a development.

The invention is particularly applicable to siege or other guns that are desired to be fired at either high or low elevations.

Various forms of fluid pressure recoil checking mechanisms have been heretofore proposed for automatically varying the length of recoil in accordance with changes in the elevation of the gun. One of the plans proposed includes the employment of means for varying the size of a single set of ports through which the braking fluid can pass from one side of a piston to the other. Another class provides a different fluid passage or orifice for each of the various lengths of recoil permitted. Mechanism of the first class cannot properly proportion the resistance except for one length of recoil, while those of the latter class cannot be readily applied to field artillery as commonly constructed, owing to the necessarily complicated nature of the construction and the amount of space which it must occupy.

By the present invention, it is possible to overcome the above noted objections to the mechanisms heretofore proposed, and to provide a simple and effective mechanism which can be readily applied to any form of ordnance, and will regulate the recoil at any elevation.

The invention is illustrated in the accompanying drawings, in which—

Figure 3:
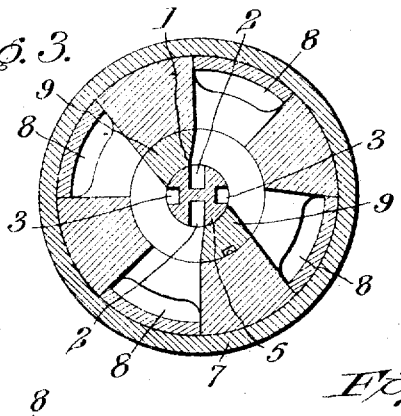
Figure 9:
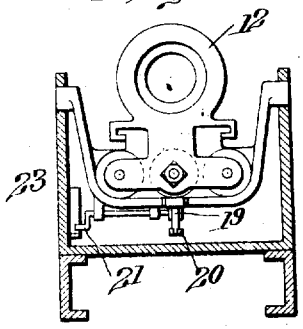
Figure 2:
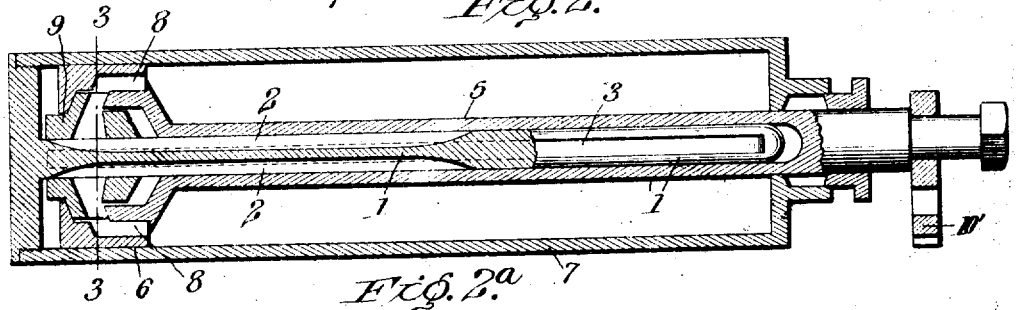
Figure 2A:
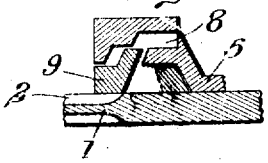
Figure 8:
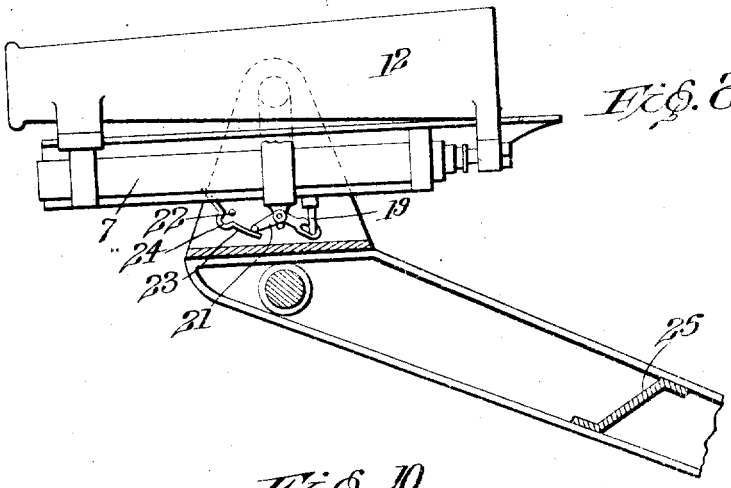
Figure 10:
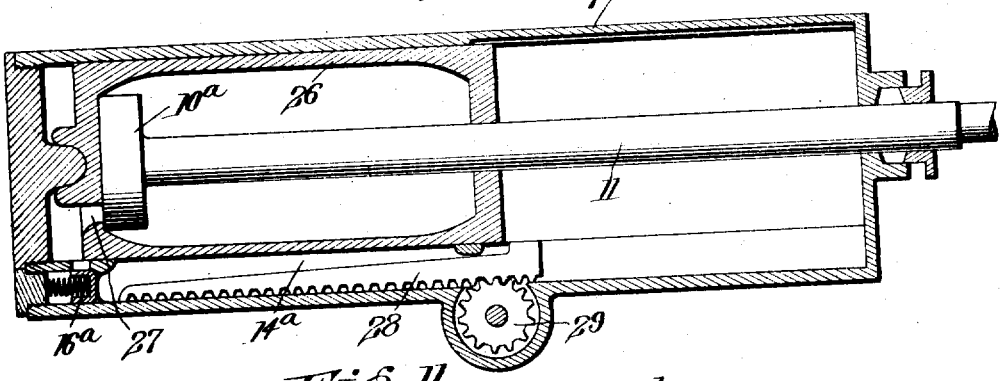
Figure 11:
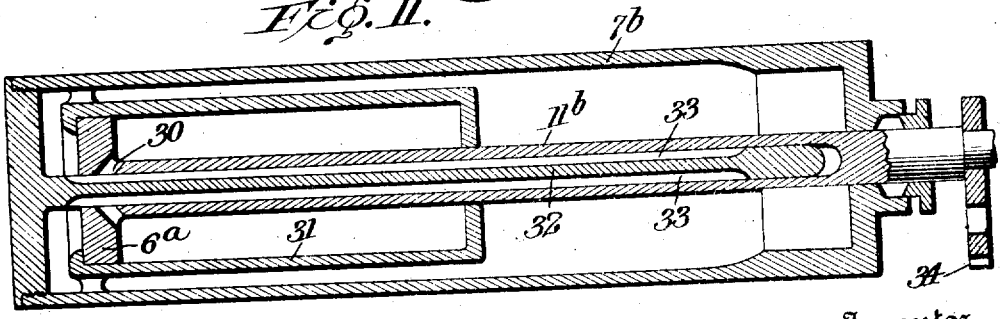

Figure 1 illustrates diagrammatically the general forms of orifices or fluid passages required for controlling the minimum and maximum or other recoils, and the principle of the present invention; *a* being the contour of the orifice for minimum recoil; *b* being the contour of the orifice for maximum recoil; *a'* a cross section of either orifice *a* or *b*; and *c* represents the difference between the orifice *a* and orifice *b*, which when used as an auxiliary orifice directly with orifice *a* would produce the same result as when orifice *b* acts alone. Fig. 2 is a longitudinal sectional view through one form of apparatus constructed in accordance with the present invention; Fig. 2ª is a sectional view showing the valve in the position occupied at the beginning of the counter recoil movement; Fig. 3 is a sectional view on the line 3—3 of Fig. 2; Fig. 4 is a longitudinal sectional view through a different form of recoil mechanism embodying the invention; Fig. 4ª is a detail view of one of the guide bars; Fig. 5 is a section on the line 5 of Fig. 4; Fig. 6 is a section on the line 6 of Fig. 4; Fig. 7 is a section on the line 7 of Fig. 4; Fig. 7ª is a section on the line 7ª of Fig. 4; Fig. 8 is a view, partly in section and partly in elevation, illustrating the devices for adjusting the valve of the auxiliary fluid passage; Fig. 9 is a transverse sectional view; Figs. 10 and 11 are longitudinal sectional views of other embodiments of the invention.

Referring to the drawings and particularly to Fig. 1, *a* illustrates the general form of orifice or fluid passage which would be used for regulating and controlling the minimum recoil permitted a piece of ordnance, and *b* represents the general form of orifice or passage required for properly controlling the maximum or other recoils each being the bottom of a groove as *a'*. According to the present invention, it is proposed to use the orifice or passage represented by *a* for all lengths of recoil and to supplement the same at proper times by an auxiliary passage or orifice of such character and capacity that the orifice or passage represented by *b* will be effective during the maximum or other recoils. By comparing the curves *a b*, it is found that the difference between them, or the amount of increase of the orifice or passage represented by curve *a* that must be provided to properly control the maximum or other recoils, is represented by *c*, and by providing means corresponding respectively to the curves *a c* and properly adjusting said means it is possible to accurately control both the minimum recoil and other recoils exceeding the minimum. That is, for properly controlling each length of recoil exceeding the minimum an auxiliary orifice is provided as represented by *c*, which is used with and in addition to the orifice represented by *a*. The capacity of both *a* and *c* being represented by *b*. As orifices *a* and *b* are similar it follows that the resistance produced when *a* and *c* are used in conjunction will be similar to those produced by *a* alone, although of lower intensity, since as orifice *a* is the minimum in capacity and in length the resistances will necessarily be of inverse ratio and consequently the maximum required to absorb the given energy of the recoiling gun.

Referring to Figs. 2 and 3, there is shown a device embodying the orifices *a* and *c* arranged to be operative for the minimum and maximum recoils permitted, in which 1 is a bar connected to the fluid cylinder 7 at its rear end. On the bar 1 grooves 2 and 3 are formed, grooves 2 corresponding to the orifice curve *a*, and grooves 3 corresponding to the orifice curve *c*. Within the cylinder 7 is arranged a piston rod 5 and a piston 6 enveloping the bar 1. The forward end of the piston rod 5 is attached to a fixed part of the gun carriage while cylinder 7 is attached to the gun 12 and recoils with it. Within the piston head 6 are arranged fluid passages 8 which connect with the grooves 2 and 3 and thereby afford communication for the liquid to the rear side of the piston. On the rear side and within the piston is formed a cavity, and in this cavity is arranged a valve 9 keyed to the piston 6, but free to be pressed to the rear by the fluid pressure, and forms part of the passages 8, but upon counter recoil of the gun the returning fluid presses the valve 9 forward, and restricts the passages 8. The valve 9 is formed in a manner that sections extend to cover over and uncover the grooves 3 in bar 1, by a rotation of the piston rod 5, and the piston 6 with valve 9, thus exposing grooves 3 to the action of the braking fluid or closing them off as required by the elevation. On the forward end of the piston rod 5 is fixed a lever or gear 10' to which is attached any suitable gearing or mechanism, as later described, for rotating the valve 9 upon a change in the elevation of the gun. The action would be as follows, assuming the gun to be fired at the highest elevation the valve 9 would be so turned that the grooves 3 are closed, and only grooves 2 are operative; this results in the minimum length of recoil, when the grooves 2 pass to the rear under passages 8. As the elevation of the gun is decreased a predetermined amount the valve 9 is turned to open the grooves 3 and the combined orifice area of grooves 2 and 3 are operative as they pass under passages 8, thus lengthening the recoil to the maximum, with accurately controlled similar resistances, for the maximum and minimum lengths of recoil. The counter recoil will be controlled by the valve 9 moving forward and restricting passages 8.

Referring to Figs. 4 to 7ª, wherein there is illustrated a recoil mechanism, embodying the principle of the present invention, of that type in which the piston is connected with the gun to move longitudinally of the relatively stationary fluid cylinder 7, it will be seen that there are arranged within the cylinder two disks or abutments 9ª, 9 between which the piston 10 operates. The stem 11 of the piston extends through the abutment 9ª and through a suitable stuffing box at the rear end of the fluid cylinder, and is suitably connected with the gun 12. The abutments 9ª, 9 are connected by rods or bars 13 which constitute a guide for the piston and also as a means for bracing said abutments. As shown in Figs. 6 and 7, the rods or bars 13 are of such cross sectional form as to constitute, with the openings in the piston head through which they extend, a fluid passage, of the capacity of *a* in Fig. 1, through which the body of fluid confined between said abutments may pass from one side of the piston to the other during recoil and counter recoil. It will be seen that the abutments or disks 9ª, 9, divide the fluid contained in the cylinder 7 into two bodies, on the pressure side of the piston the main or principal body, which is operative to check the recoil at all elevations of the gun, being confined between said abutments, while the auxiliary body of fluid is confined within the spaces between the ends of the cylinder and the abutments, said spaces being connected by an auxiliary passage 14 with which coöperate two valves 15, 16.

When the gun is at its maximum elevation, the parts above referred to will occupy the relative positions shown in Fig. 4. That is, the auxiliary passage 14 will be entirely closed by the valve 15 and therefore during recoil the only passage through which the braking fluid can pass from one side of the piston to the other is that provided by the guide bars 13 and the openings in the piston head through which said bars pass. This is of such dimensions that the recoil will be properly checked in the minimum distance permitted by the mechanism, since the orifice is of the capacity of *a* in Fig. 1. The body of fluid to the rear of abutment 9ª, of the auxiliary body, serving at this time to simply transmit the pressure to the rear cylinder head.

When the elevation of the gun is lowered to a predetermined extent the valve 15 will be automatically adjusted to open the auxiliary passage 14 and when the parts are in such condition, a longer recoil will be permitted. Under such conditions, the operation of the piston and guide bars 13 will be similar to that during the minimum length of recoil, but as the passage 14 is open a portion of the auxiliary body of fluid will pass from one side of the piston to the other and thus permit the abutments 9ª, 9 to move longitudinally of the cylinder 7 simultaneously and in the same direction that the piston and gun move and therefore a greater length of recoil will be permitted with correspondingly reduced resistances throughout the recoil. The extent of movement of the abutments relative to the cylinder 7 is dependent on the extent of opening of the valve 15 and the amount of pressure created by the movement of the piston toward the abutment 9ª. When said valve is moved outward to fully open the auxiliary passage 14, the abutments will move rearward during recoil until the rear abutment 9ª closes the port 14ª through which the passage 14 communicates with the rear portion of the cylinder 7, the piston having meantime reached the limit of its movement along the curved bars 13, and therefore the maximum length of recoil will occur.

The introduction of the fluid controlled abutment renders it possible to obtain resistances throughout the different recoils, with sensibly similar characteristics to those of the minimum recoil, by using an auxiliary orifice that opens to increase the recoil length, but that remains constant throughout the time of the recoil, since the orifice curve *a* is operative throughout the length of each recoil.

During counter recoil, or while the gun is being returned to its "in battery" position, which movement may be effected by suitable springs or other means commonly employed, the flow of fluid through the auxiliary passage 14 will be controlled by the spring pressed valve 16 which restricts the return flow of the fluid, and the force of the counter recoil may be further cushioned by suitable plungers 17, 18 to bring the gun to rest.

Any suitable means may be employed for shifting or adjusting the valve 15. As shown in Figs. 4 and 8 the rod or stem 19 thereof is connected with one arm of a slotted lever 20 journaled in suitable bearings below the cradle or gun support and the other end of said shaft is provided with an arm 21 which, as the elevation of the gun is raised, will contact with a stop 22 on the frame of the gun carriage. Continuing, the elevation of the gun will cause the slotted lever 20 to move and force the valve 15 inwardly so that when the gun is at its maximum elevation the auxiliary passage 14 will be entirely closed and the parts will occupy the relative positions illustrated in Fig. 4. A suitable guide 23 is provided for the end of the arm 21 said guide having a deflected section 24 into which said arm extends when the elevation of the gun has brought it into contact with the stop 22. The stop 22 will be properly located with reference to the arm 21 to insure that the valve 15 will be adjusted to provide the desired length of recoil at a particular elevation. It is possible by this construction to permit the gun to have a maximum extent of recoil until the elevation of the gun has nearly reached such a degree that the breech thereof will strike a portion of the gun trail, as for instance, a cross piece or brace 25, when the engagement of the stop 22 and arm 21 will actuate the valve to reduce the length of recoil. The auxiliary fluid passage may be formed in a different manner and the area or extent thereof varied by means different from those just described, which will close off the orifice at all lengths of recoil.

In Fig. 10 is shown a slightly different arrangement of parts for this purpose. Referring to said figure it will be seen that the piston $10^a$ is arranged within a cylinder 26 having a port 27 at one end; and the auxiliary passage $14^a$ for the braking fluid is formed between said inner cylinder 26 and the main fluid cylinder $7^a$, the area of said passage being controlled by a valve formed by a tapered bar 28 having on its lower face a rack with which engages a pinion 29 that is rotated as the elevation of the gun is varied. This can be accomplished by the shaft provided with the arm 21 previously described. As shown a longitudinal groove is preferably formed in the side of the cylinder which groove is of the same width as the groove in which the tapered bar 28 slides. This clearance groove insures a balancing of the inner cylinder preventing friction due to pressure which acts to press the cylinder against the wall of the outer cylinder. With this construction the operation during recoil will be the same as that of Figs. 4–$7^a$ previously described in that the piston $10^a$ moves to the rear with the gun 12. When the parts are in the position shown the auxiliary fluid passage $14^a$ is entirely closed and the minimum length of recoil results, this being controlled by the movement of fluid in the inner cylinder 26 from one side of the piston head to the other through the space around the piston $10^a$ which corresponds to the orifice *a* of Fig. 1. The inner cylinder 26 remains stationary since the liquid in the rear part of cylinder $7^a$ cannot escape, and only acts to transmit the resistance to the forward head of cylinder $7^a$. When the elevation of the gun is lowered a predetermined extent the pinion 29 will be actuated and adjust the valve to open the auxiliary fluid passage more or less and thereby permit fluid to flow from the chamber in rear of the inner cylinder 26, the latter then moving rearwardly simultaneously during recoil with the piston $10^a$ and gun 12, to the opposite side of the piston, thus increasing the length of recoil. The area of the orifice $14^a$ is proportioned and maintained by the movement of the bar 28 longitudinally so as to allow the inner cylinder 26 to recoil sufficiently to close the orifice $14^a$ at the end of recoil, since the piston $10^a$ has simultaneously recoiled to the end of its allowed movement within the cylinder 26. The recoil of the piston $10^a$ relative to the cylinder $7^a$ being the total recoil, which equals the recoil of the piston $10^a$ within the cylinder 26 plus the recoil of the cylinder 26 within cylinder $7^a$, the resistance of such recoils is similar to that of the minimum recoil. In counter recoil the fluid is restricted by the valve $16^a$, as in the previous form, thus controlling the return of the gun into battery.

In the foregoing description of this form in Figs. 4–10 it has been assumed that the cylinders 7, $7^a$, were relatively stationary and that the piston was moved rearwardly therein during recoil, being connected with the gun. The invention in this form is, however, equally applicable to recoil checking mechanism of the opposite character or type, namely that in which the piston is held stationary during recoil and the fluid cylinder connected with the gun moves rearwardly during recoil, as illustrated in Figs. 2–3. Such an embodiment of the invention is illustrated in Fig. 11, referring to which it will be seen that the stem or rod $11^b$ of the piston $6^a$ is provided with a chamber that communicates through ports 30 with the inner cylinder 31 in which is contained the auxiliary or supplemental body of braking fluid that is operative only when the length of recoil exceeds the minimum. Into said chamber in the piston $6^a$ and rod $11^b$ extends a bar 32 connected to the rear end of the main fluid cylinder $7^b$, said bar having grooves 33 formed therein, and adapted to communicate with the ports 30 in the piston $6^a$ when the latter is properly adjusted. The ports 30 are adjusted over the grooves 33 by rotation of the piston rod $11^b$ by means of suitable gearing 34 connected to operate, as previously described, when the gun is elevated or depressed. The grooves 33 are of uniform area and have the same function as the passages 14 and $14^a$ of the two previous forms, being closed or inoperative when the gun is operating at the minimum recoil. Fluid orifices are formed between the outer cylinder $7^b$ and the inner cylinder 31, which have a capacity as *a* in Fig. 1, being for the minimum recoil. A movement of the gun in recoil causing the outer cylinder to close off said orifices and maintain the resistance since it will be understood that both cylinders 31 and $7^b$ are filled with the braking fluid and when the parts are adjusted for the minimum length of recoil, the piston will be held in a fixed position relative to the inner cylinder 31 as the ports 30 therein do not communicate with the grooves 33. Under these conditions, the inner cylinder 31 and the fluid therein become in effect a part of the piston and remain stationary while the outer cylinder $7^b$ moves rearwardly thereover during recoil.

As the elevation of the gun is lowered to such an extent that it is desirable to increase the length of recoil, the piston will be rotated by the gear 34 and suitable connections to bring the ports 30 therein into communication with the grooves 33, and during recoil with the parts in this position the fluid contained in the inner cylinder 31 will be permitted to flow through said ports 30 and grooves 33 to the rear of the piston $6^a$ and therefore said inner cylinder 31 will move rearwardly simultaneously with the main cylinder $7^b$ and gun 12 and the length of recoil will be increased.

It will be seen that each of the several forms of recoil mechanism illustrated employ the same principle. That is, in each there is a passage for fluid from one side of the piston to the other which is operative at all recoils or elevations of the gun, and in addition, an auxiliary passage or passages (the dimensions of which are automatically varied by changes in the elevation of the gun, and are such that the resistances are properly regulated and have characteristics sensibly similar to the resistance of the minimum recoil) are provided when the recoil is to be of other than the minimum length. Any of the forms of recoil mechanism illustrated may be employed, the particular one selected depending on the degree of refinement of control which is desired.

It will be observed that to obtain the effect of orifice curve *b*, Fig. 1, it is necessary to employ with orifice curve *a*, which is fixed and used for all lengths of recoil an additional orifice curve represented by *c*. When such orifice *c* is employed directly with orifice curve *a*, the form of orifice *c* increases from the origin to the end of orifice curve *a*, and from this point to the end decreases, providing means are not introduced for permitting the operation of orifice curve *a* throughout the length of the recoil required, in which case a constant auxiliary orifice can be employed during each recoil exceeding the minimum. By introducing means as shown this can be accomplished.

What I claim is:

1. In a fluid pressure recoil checking mechanism for ordnance, the combination with a fluid cylinder, and a piston in said cylinder, of means providing a fluid passage from one side of the piston to the other that is operative at all elevations of the gun, said passage varying in sectional area for different relative positions of the piston and cylinder and being of such capacity that the flow of fluid therethrough will properly check the recoil when the gun is at its maximum elevation, means for providing a supplemental or auxiliary fluid passage from one side of the piston to the other, and means for automatically varying the dimensions of said supplemental passage in accordance with variations in the elevation of the gun, for the purpose described.

2. In a fluid pressure recoil checking mechanism for ordnance, the combination with a fluid cylinder, and a piston in said cylinder, of means providing a fluid passage from one side of the piston to the other that is operative at all elevations of the gun, said passage varying in sectional area for different relative positions of the piston and cylinder and being of such capacity that the flow of fluid therethrough will properly check the recoil when the gun is at its maximum elevation, means for providing a supplemental or auxiliary fluid passage from one side of the piston to the other, and means for automatically increasing the capacity of said supplemental passage as the elevation of the gun is reduced from the maximum, for the purpose specified.

3. In a fluid pressure recoil checking mechanism for ordnance, the combination with a fluid cylinder, and a piston in said cylinder, said piston and cylinder being relatively movable during recoil, of means dividing the fluid in the cylinder into two tandem bodies on the pressure side of the piston, means preventing movement of one of said bodies of fluid relative to the cylinder during recoil when the gun is at its maximum elevation, and means for permitting fluid from both said bodies to flow from one side of the piston to the other during recoil when the elevation of the gun is reduced, for the purpose specified.

4. In a fluid pressure recoil checking mechanism for ordnance, the combination with a fluid cylinder, and a piston in said cylinder, said piston and cylinder being relatively movable during recoil, of means dividing the fluid in the cylinder into two tandem bodies on the pressure side of the piston, means for permitting fluid from the main fluid body to pass from one side of the piston to the other during recoil at all elevations of the gun, means for preventing fluid from the auxiliary fluid body from passing from one side of the piston to the other during recoil when the gun is at a predetermined elevation, and means for permitting fluid from said auxiliary body to pass the piston when the elevation of the gun is reduced, for the purpose specified.

5. In a fluid pressure recoil checking mechanism for ordnance, the combination with a fluid cylinder, and a piston in said cylinder, said piston and cylinder being relatively movable during recoil, of means dividing the fluid in the cylinder into two tandem bodies on the pressure side of the piston, and means for rendering one of said bodies inoperative when the elevation of the gun is raised to a predetermined extent, whereby the length of recoil can be automatically varied.

6. In a fluid pressure recoil checking mechanism for ordnance, the combination with a fluid cylinder, and a piston in said cylinder, said piston and cylinder being relatively movable during recoil, of a body of fluid within the cylinder adapted to cooperate with the piston and cylinder to check the recoil when the gun is at its maximum elevation, and an auxiliary body of fluid within the cylinder adapted to coöperate with the main body in checking the recoil when the elevation of the gun is reduced a predetermined extent.

7. In a fluid pressure recoil checking mechanism for ordnance, the combination with a fluid cylinder, of two abutments mounted in and adapted to move longitudinally of said cylinder, a piston within the cylinder between said abutments, said piston and cylinder being relatively movable longitudinally of the cylinder, means connecting said abutments and coöperating with the piston to provide a fluid passage from one side of the piston to the other, that is operative at all elevations of the gun, a supplemental valved passage for conducting fluid from one side of the piston to the other, which when opened permits said abutments to move longitudinally of the cylinder, and means for automatically varying the extent of opening of said supplemental passage in accordance with variations in the elevation of the gun, substantially as and for the purpose described.

8. In a fluid pressure recoil checking mechanism for ordnance, the combination with a fluid cylinder, of two abutments mounted in and adapted to move longitudinally of said cylinder, a piston within the cylinder between said abutments, said piston and cylinder being relatively movable longitudinally of the cylinder, means connecting said abutments and coöperating with the piston to provide a fluid passage from one side of the piston to the other that is operative at all elevations of the gun, a supplemental passage through which fluid can pass from one side of the piston to the other, a valve for closing said supplemental passage, and means for holding the valve in position to close said supplemental passage when the gun is at its maximum elevation and adjusting said valve to open said passage as the elevation of the gun is reduced a predetermined extent, for the purpose specified.

9. In a fluid pressure recoil checking mechanism for ordnance, the combination of a relatively stationary fluid cylinder, a piston in said cylinder arranged to move longitudinally thereof during recoil, a fluid passage varying in sectional area for different relative positions of the piston and cylinder and controlled by the piston and operative at all elevations of the gun, a supplemental passage through which fluid can flow from one side of the piston to the other, a valve for closing said supplemental passage, and means for adjusting said valve to vary the extent of opening of said supplemental passage in accordance with variations in the elevation of the gun, for the purpose specified.

10. In a fluid pressure recoil checking mechanism for ordnance, the combination of a relatively stationary fluid cylinder, a piston in said cylinder arranged to move longitudinally thereof during recoil, a fluid passage varying in sectional area for different relative positions of the piston and cylinder and controlled by the piston and operative at all elevations of the gun, a supplemental passage through which fluid can flow from one side of the piston to the other, a valve for closing said supplemental passage, and means for moving said valve to open the supplemental passage when the elevation of the gun is varied a predetermined extent, for the purpose specified.

11. In a fluid pressure recoil checking mechanism for ordnance, the combination of a relatively stationary fluid cylinder, two abutments mounted in said cylinder and dividing the fluid therein into two bodies, a piston mounted between said abutments and connected with the gun, means for providing a passage operative at all elevations of the gun for conducting the main body of fluid situated between said abutments from one side of the piston to the other during recoil, an independent passage for conducting fluid from the chamber between said abutments and the end of the cylinder from one side of the piston to the other, a valve for closing said auxiliary passage when the gun is at its maximum elevation, and means for automatically adjusting said valve to open said passage to a greater or less amount when the elevation of the gun is reduced a predetermined extent, for the purpose described.

12. The combination, in a recoil mechanism for guns, of recoil checking means comprising means to vary the length of recoil for different elevations of the gun, and means to control the checking means at each instant of recoil in proportion to the retarded velocity for the instant in question; substantially as described.

13. The combination, in a recoil mechanism for guns, of a recoil cylinder and piston provided with a by-pass, means to vary the length of recoil for different elevations of the gun, and means to change the by-pass in proportion to the changes in the retarded velocities of the recoiling parts at each instant of recoil, and thereby cause the pressure in the cylinder to remain substantially constant throughout the recoil, substantially as described.

14. In a gun mount, the combination of a piston and recoil cylinder containing a fluid and provided with a by pass, automatic means to vary the length of recoil for different elevations of the gun, and automatic means adapted as the gun recoils to vary the exit of said fluid through said by pass in accordance with the retarded velocities of the recoiling parts at each instant of the recoil, whereby the pressure in said cylinder remains substantially constant throughout the recoil, substantially as described.

In testimony whereof I affix my signature.

FRANK B. YINGLING.